United States Patent
Kang et al.

Patent Number: 5,726,811
Date of Patent: Mar. 10, 1998

[54] COMPACT ZOOM LENS SYSTEM

[75] Inventors: Geon-Mo Kang; Hae-Jin Lee, both of Kyeongsangnam-do, Rep. of Korea

[73] Assignee: Samsung Aerospace Industries, Ltd., Kyeongsangnam-do, Rep. of Korea

[21] Appl. No.: 764,767

[22] Filed: Dec. 12, 1996

[30] Foreign Application Priority Data

Dec. 14, 1995 [KR] Rep. of Korea ............... 95-50067

[51] Int. Cl.$^6$ .................................................. G02B 15/14
[52] U.S. Cl. .................................................. 359/692
[58] Field of Search ................................. 359/691, 692

[56] References Cited

U.S. PATENT DOCUMENTS

| | | | |
|---|---|---|---|
| 4,929,069 | 5/1990 | Shibayama | 359/691 |
| 4,998,808 | 3/1991 | Shibayama | 359/692 |
| 5,144,489 | 9/1992 | Shibayama | 359/692 |
| 5,398,135 | 3/1995 | Ohashi | 359/692 |
| 5,576,891 | 11/1996 | Ohashi | 359/692 |
| 5,636,061 | 6/1997 | Kang | 359/691 |

FOREIGN PATENT DOCUMENTS

| | | |
|---|---|---|
| 2-120714 | 5/1990 | Japan . |
| 3-160610 | 7/1991 | Japan . |
| 4-225309 | 8/1992 | Japan . |
| 5-127082 | 5/1993 | Japan . |
| 7-72388 | 3/1995 | Japan . |

Primary Examiner—David C. Nelms
Assistant Examiner—Evelyn A. Lester
Attorney, Agent, or Firm—Finnegan, Henderson, Farabow, Garrett & Dunner, L.L.P.

[57] ABSTRACT

A compact lens system is disclosed which includes a first lens group and a second lens group. The first lens group, which has an overall positive refractive power, includes a first meniscus lens, convex toward an object, and having a positive refractive power. Also included is a second biconcave lens having a negative refractive power, and a third biconvex lens which is connected to the second lens and which has a positive refractive power. The first lens group further includes a fourth biconvex lens which has a positive refractive power. The second lens group has an overall negative refractive power, and includes: a fifth concave lens having a positive refractive power; a sixth concave lens having a negative refractive power; and a seventh lens having a negative refractive power. The magnification of the system can be changed by varying a distance between the first and the second lens group in accordance with the following condition:

$$1.1 < (f_{bT} - f_{bW})/(L_T - L_W) < 1.24$$

where $L_W$ is the length of the zoom lens system at a wide angle position, $L_T$ is the length of the zoom lens system at a telephoto angle position, $f_{bT}$ is the back focal length at the telephoto angle position, and $f_{bW}$ is the back focal length at the wide angle position.

6 Claims, 20 Drawing Sheets

< Wide angle position >

< Telephoto angle position >

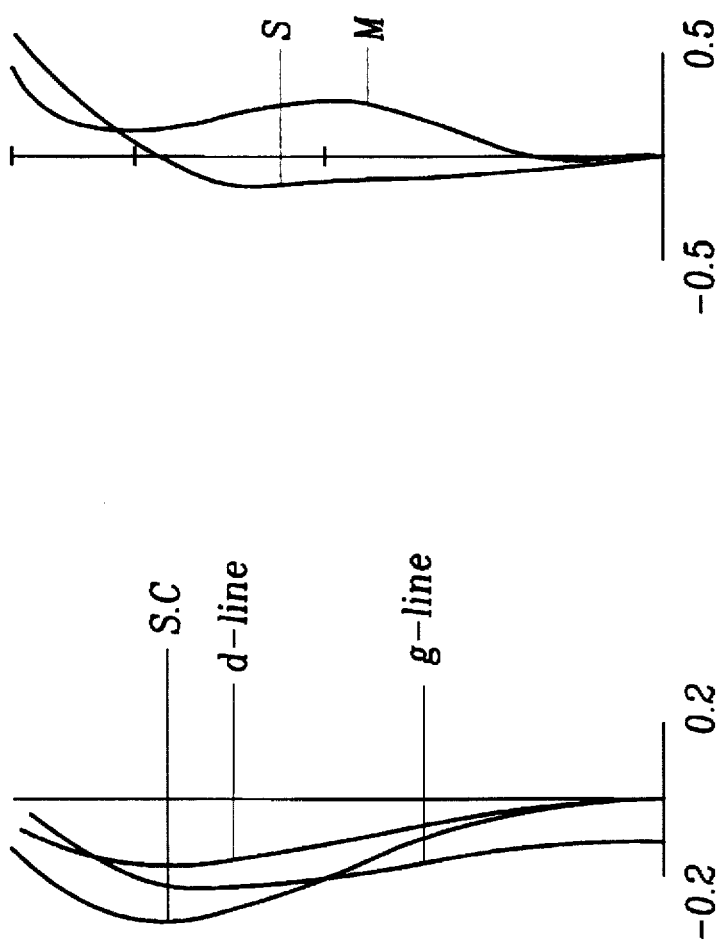

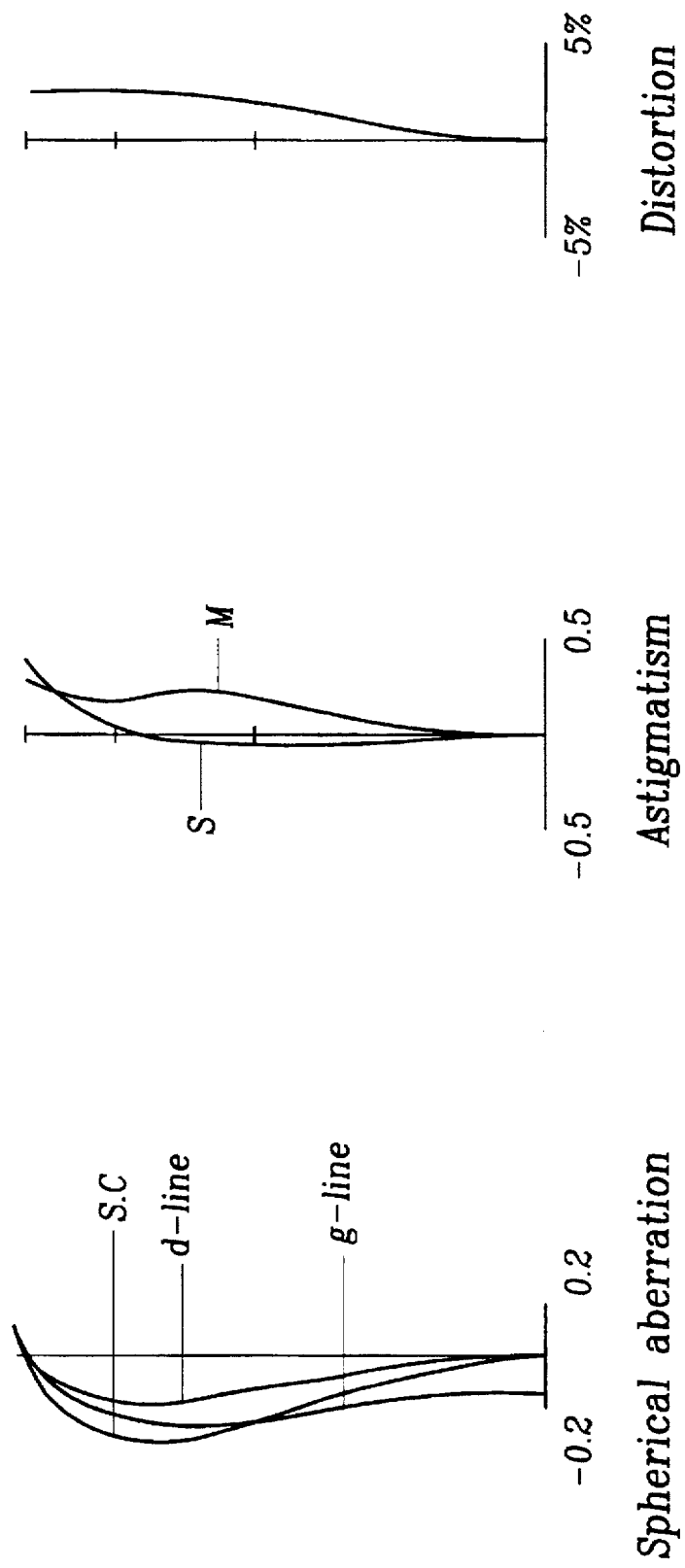

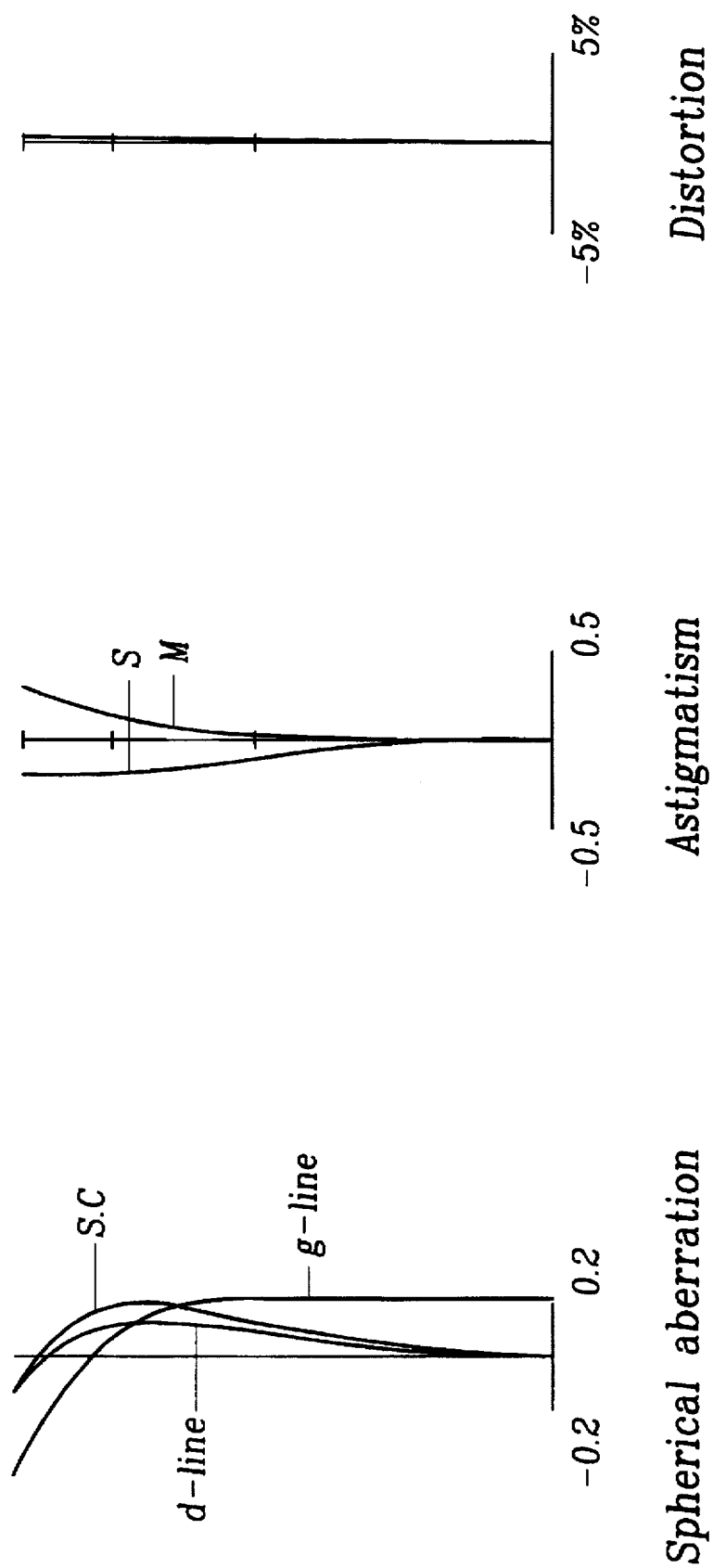

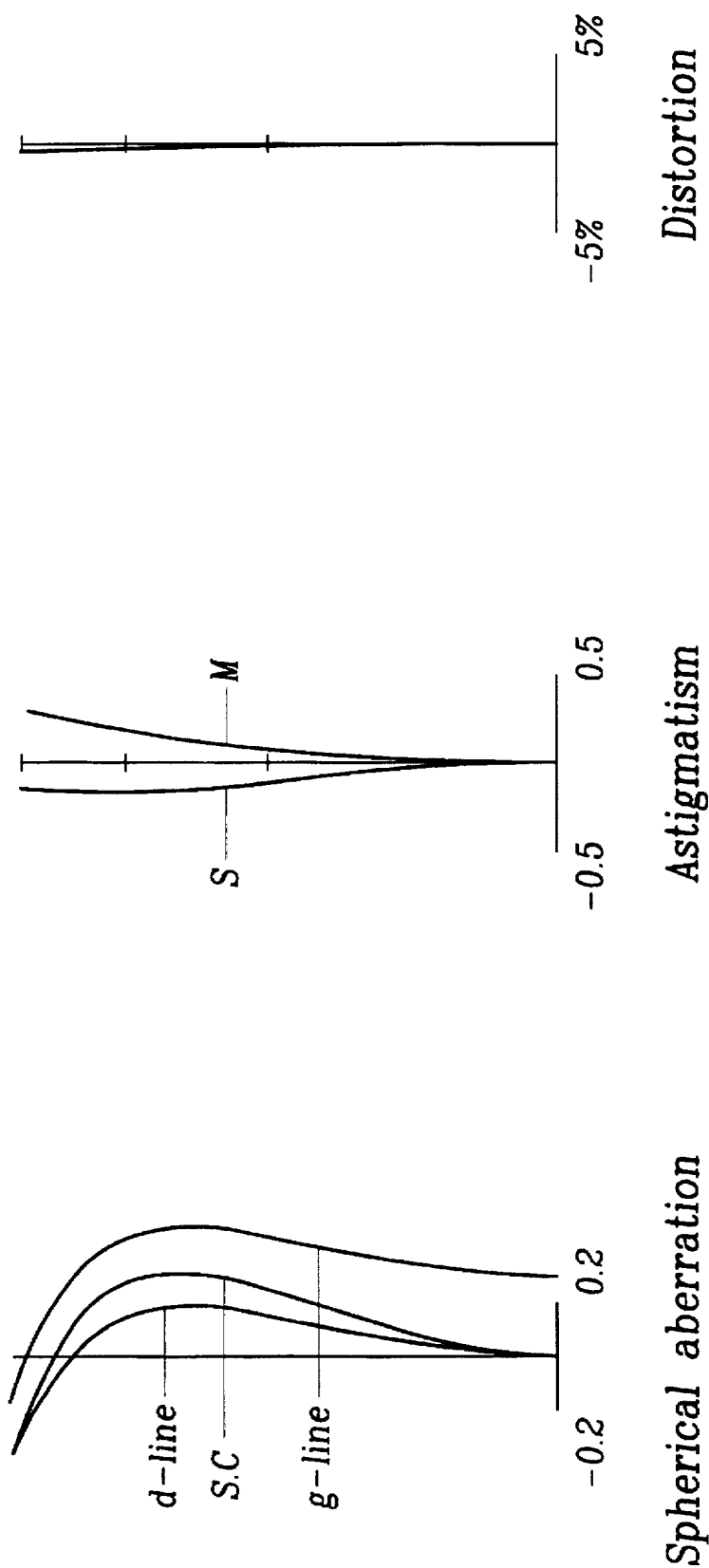

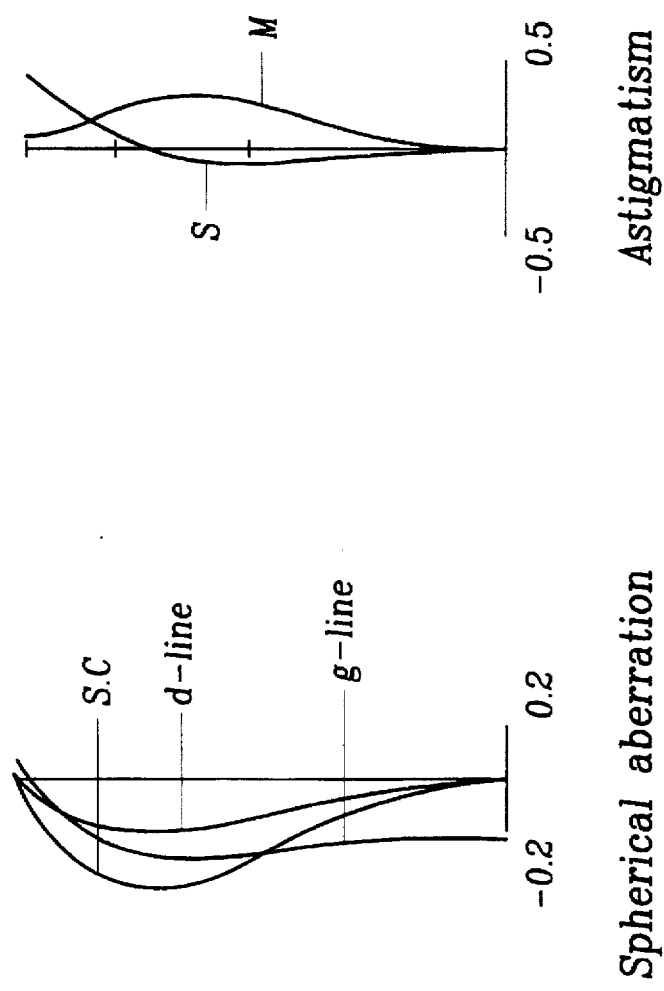

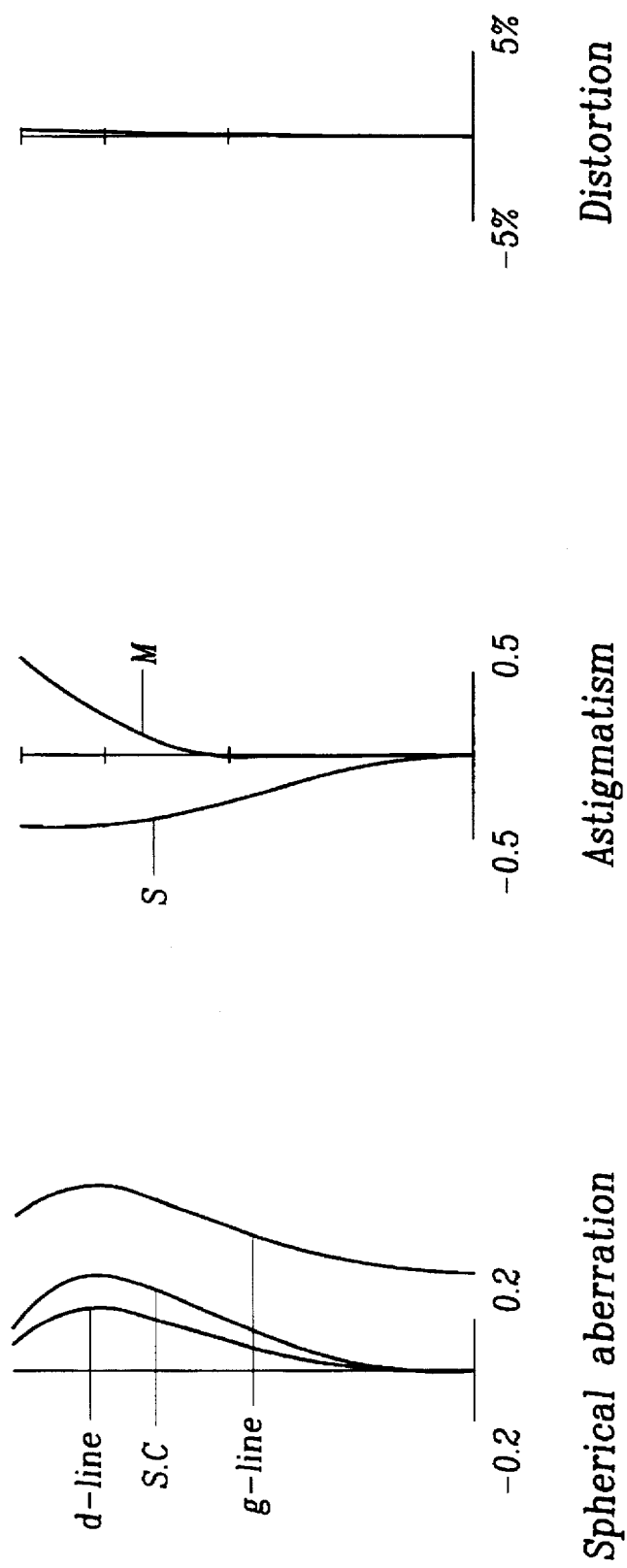

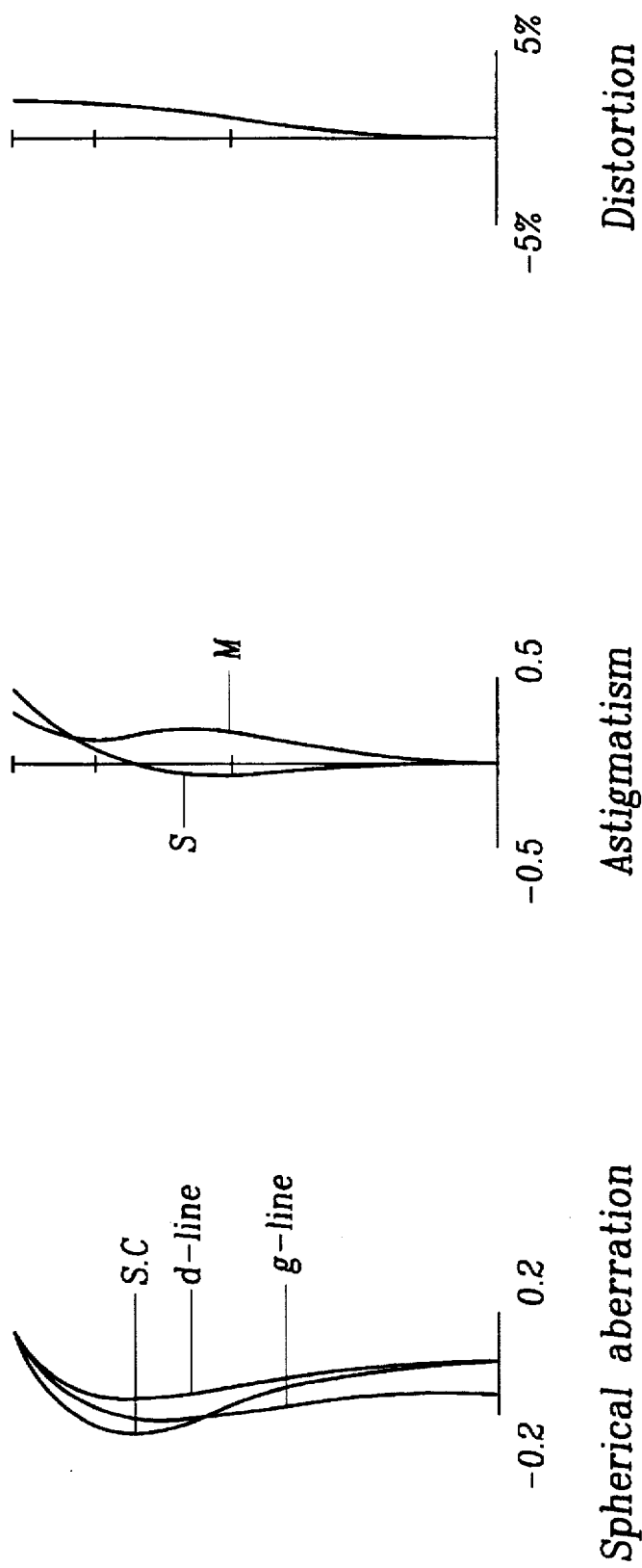

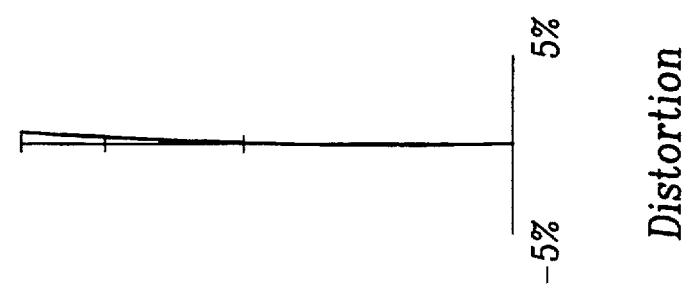
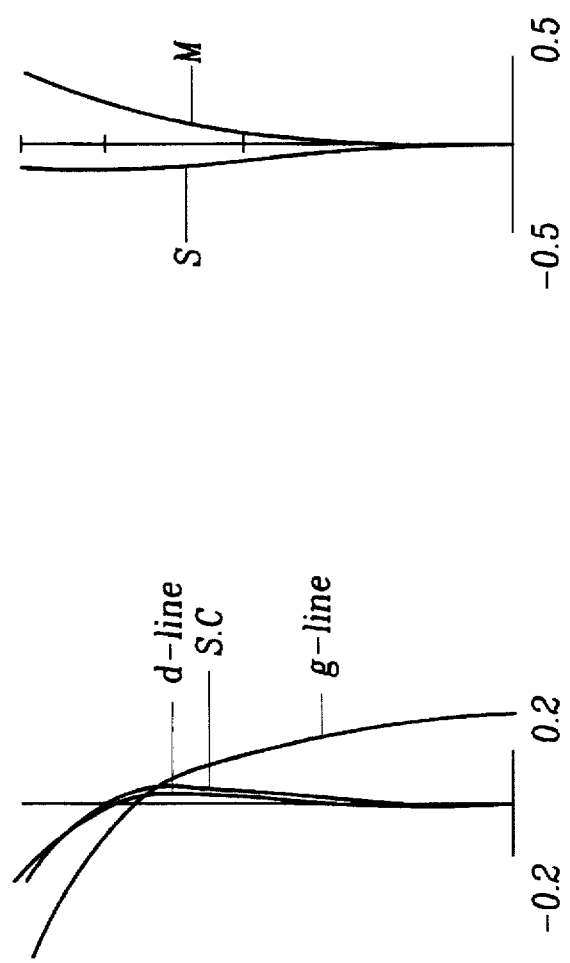
Fig. 15A  Fig. 15B  Fig. 15C

COMPACT ZOOM LENS SYSTEM

BACKGROUND OF THE INVENTION

A. Field of the Invention

The present invention relates to a compact zoom lens system. More particularly, the present invention relates to a compact zoom lens system comprising two lens groups whose lens configuration enables high performance and a high zoom ratio, while allowing for a reduction in the system's size as well.

B. Description of the Prior Art

Recently, automatic and compact type cameras are being provided with zooming features through the use of a zoom lens. However, the public demand has increased for cameras which are both inexpensive and light weight. In addition to these requirements, professionals in the field and other high grade users are demanding that these cameras still be able to maintain a high level of performance and have a high number of functions as well.

Generally, the prior art zoom lens systems for compact cameras can be divided into two types: those having two lens groups and those having three lens groups. In order to decrease the size of the camera, the two lens group type system is commonly used. Prior art zoom lens systems comprising two lens groups are recorded in Japanese Publication Nos. Hei 3-160610, Hei 7-72388, Hei 4-225309, Hei 2-120714, Hei 5-127082, and in U.S. Pat. No. 4,929,069. In these prior art zoom lens systems, however, it is difficult to achieve a high magnification since the maximum magnification they can achieve is only 2.0

SUMMARY OF THE INVENTION

An important principle advantage of the present invention is the provision of an arrangement which substantially obviates one or more of the limitations and disadvantages of the described prior art arrangements. In particular, the present invention is directed to a compact zoom lens system that has a compact size, high performance, and a high zoom lens ratio.

Additional features and advantages of the invention will be set forth in the description which follows, and in part will be obvious from the description, or may be learned by practice of the invention. The objectives and other advantages of the invention may be realized and attained by the apparatus particularly pointed out in the written description and claims hereof, as well as the appended drawings.

To achieve these and other advantages and in accordance with the purpose of the invention, as embodied and broadly described, the invention comprises a compact zoom lens system which includes two lens groups. The first lens group has an overall positive refractive power, and includes four lenses. The first lens unit is a meniscus lens that is convex toward an object, and which has a positive refractive power. The second lens unit is a biconcave lens having a negative refractive power. The third lens unit is a biconvex lens having a positive refractive power, and is fixed to the second lens unit. The fourth lens unit is a biconvex lens having a positive refractive power.

The second lens group has an overall negative refractive power, and includes three lenses. The fifth lens unit which is a meniscus lens, is convex toward the object, and has a positive refractive power. The sixth lens unit is a concave lens having a negative refractive power. The seventh lens unit has a negative refractive power.

The magnification of the system can be changed by varying a distance between the first lens group and the second lens group, wherein the following conditions are satisfied:

$1.1 < (f_{bT} - f_{bW})/(L_T - L_W) < 1.24$, $L_W/f_W < 1.25$, $L_T/f_T < 0.97$, where:

$L_W$ represents the length of the zoom lens system at a wide angle position;

$L_T$ represents the length of the zoom lens system at a telephoto angle position;

$f_{bT}$ represents a back focal length at the telephoto angle position;

$f_{bW}$ represents a back focal length at the wide angle position;

$f_W$ represents a focal length of the zoom lens system at the wide angle position; and $f_T$ represents a focal length of the zoom lens system at the telephoto angle position.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are incorporated in and constitute a part of the specification, illustrate embodiments of the invention and, together with the description, serve to explain the objects, advantages, and principles of the invention. In the drawings:

FIGS. 2A to 2C show the aberration curves of a compact zoom lens system at a wide angle position in accordance with the first preferred embodiment of the present invention;

FIGS. 5A to 5C show the aberration curves of a compact zoom lens system at a wide angle position in accordance with the second preferred embodiment of the present invention;

FIGS. 6A to 6C show the aberration curves of a compact zoom lens system at a telephoto angle position in accordance with the second preferred embodiment of the present invention;

FIGS. 9A to 9C show the aberration curves of a compact zoom lens system at a telephoto angle position in accordance with the third preferred embodiment of the present invention;

FIGS. 11A to 11C show the aberration curves of a compact zoom lens system at a wide angle position in accordance with the fourth preferred embodiment of the present invention;

FIGS. 12A to 12C show the aberration curves of a compact zoom lens system at a telephoto angle position in accordance with the fourth preferred embodiment of the present invention;

FIGS. 14A to 14C show the aberration curves of a compact zoom lens system at a wide angle position in accordance with the fifth preferred embodiment of the present invention; and FIGS. 15A to 15C show the aberration curves of a compact zoom lens system at a telephoto angle position in accordance with the fifth preferred embodiment of the present invention.

DESCRIPTION OF THE PREFERRED EMBODIMENTS

Embodiments of the present invention will now be described with reference to the accompanying drawings.

Figure 1A:
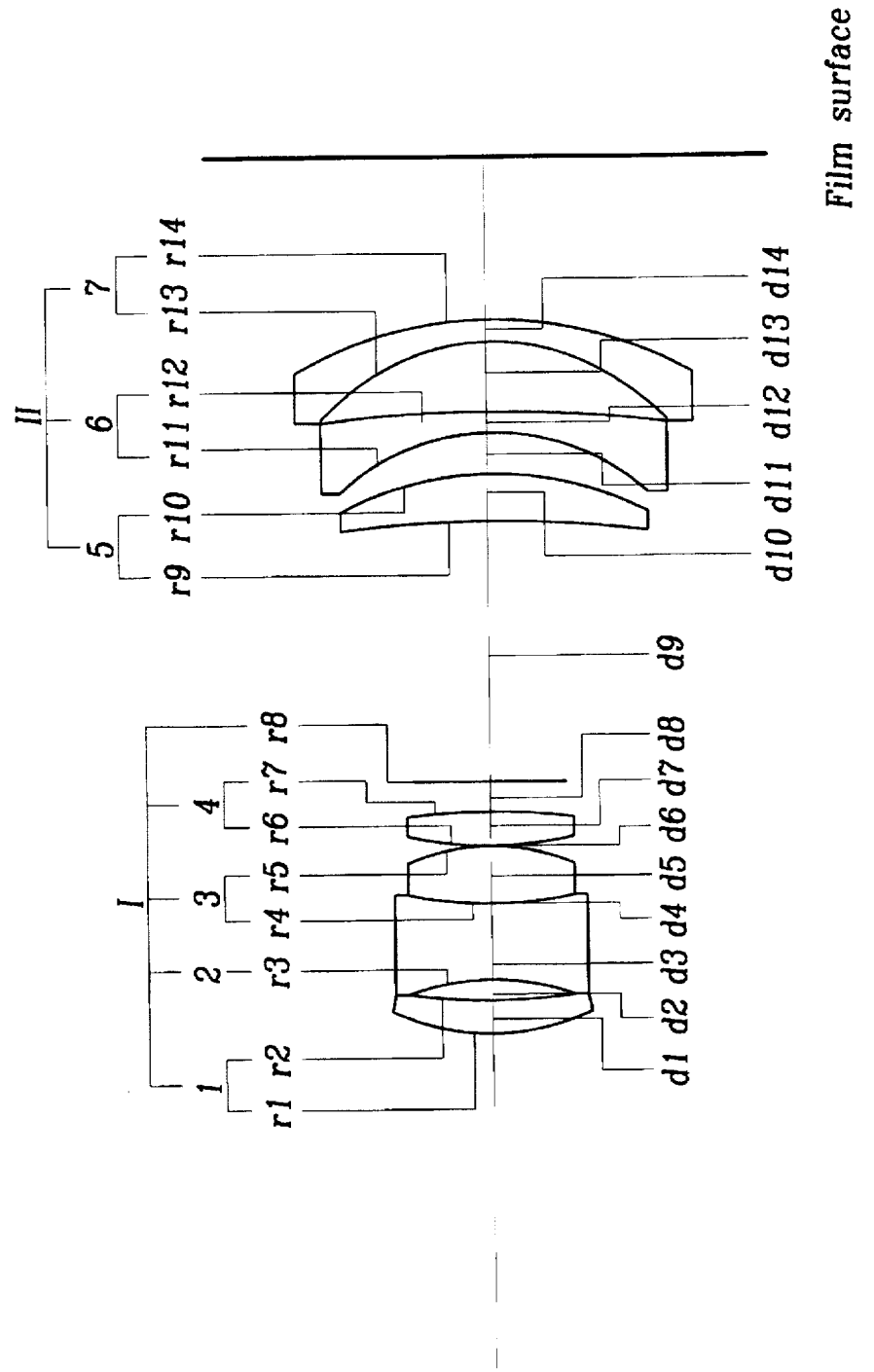
FIGS. 1A and 1B are sectional views illustrating a compact zoom lens system at a wide angle position and a telephoto angle position, respectively, in accordance with a first preferred embodiment of the present invention.
Figure 1B:
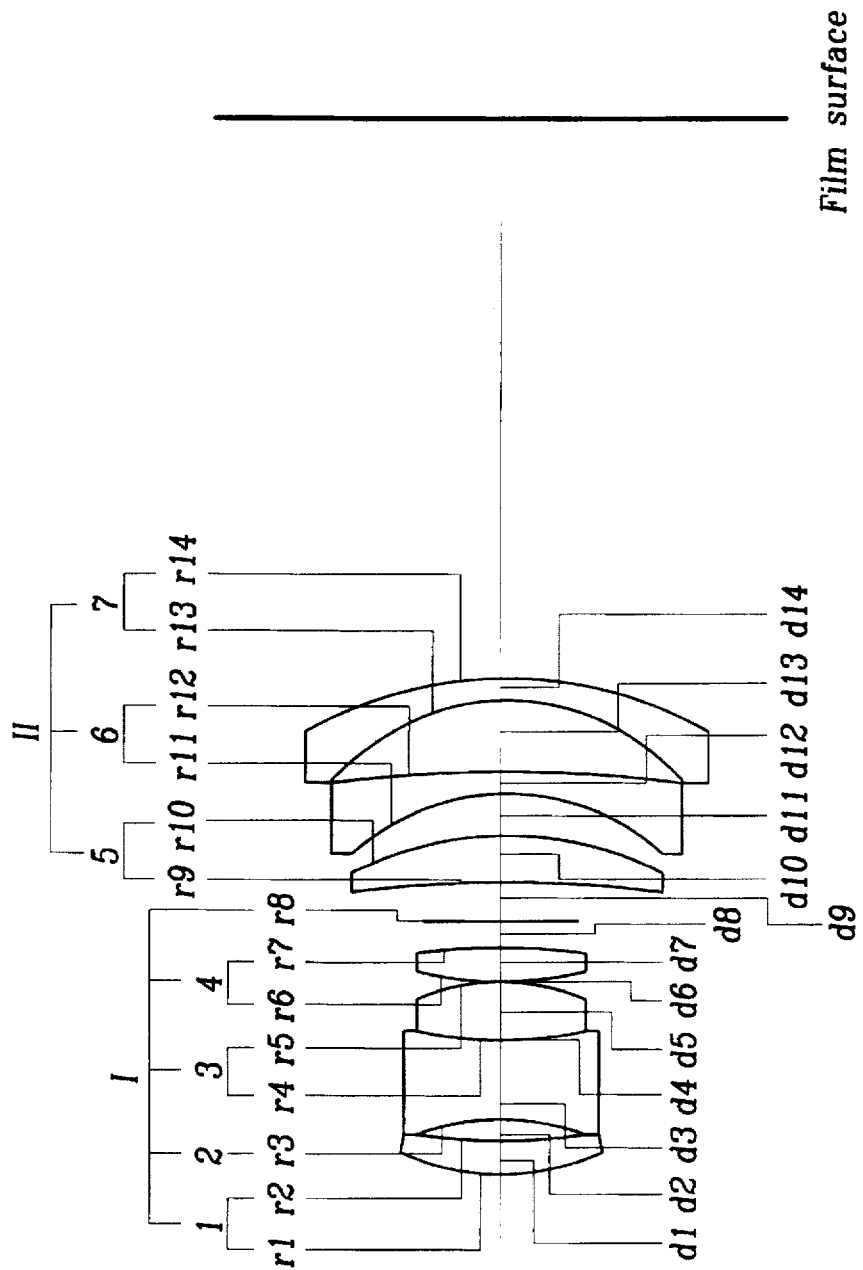
Figure 4A:
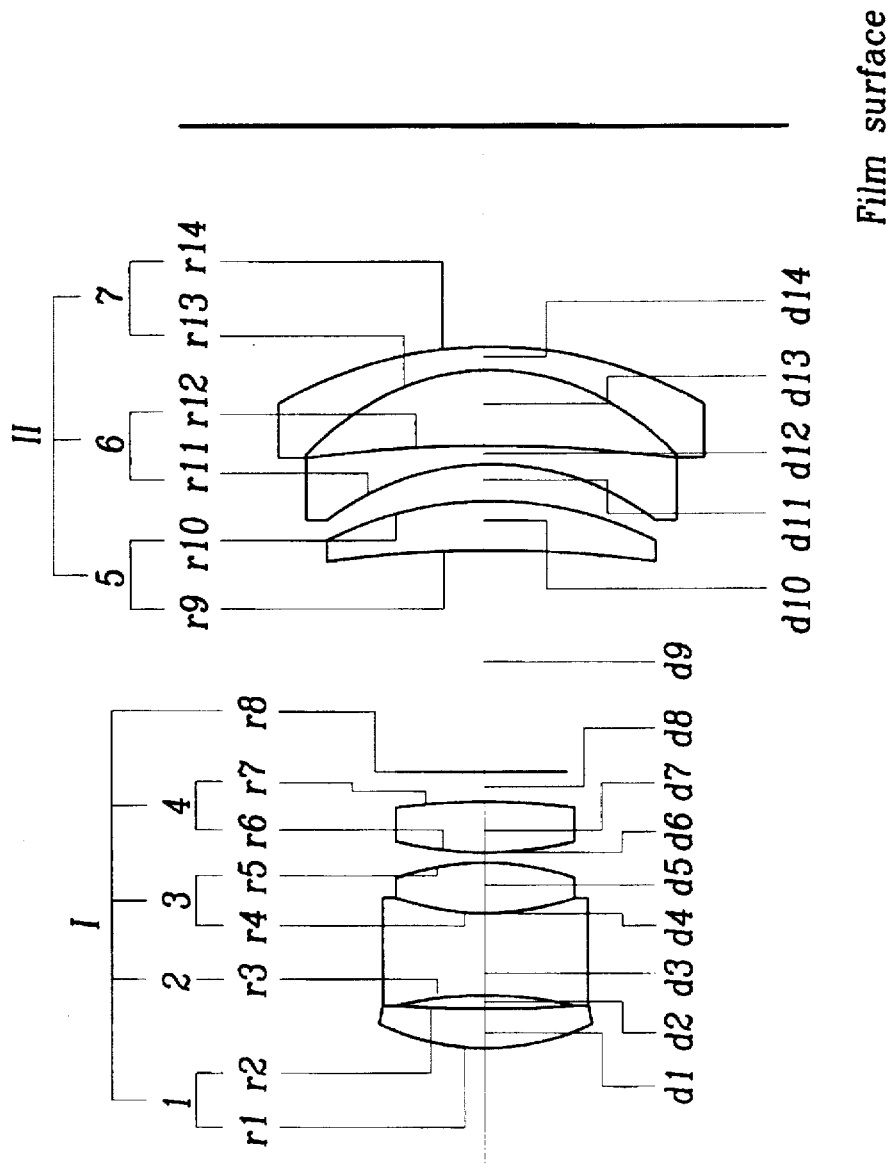
FIGS. 4A and 4B are sectional views illustrating a compact zoom lens system at a wide angle position and a telephoto angle position, respectively, in accordance with a second preferred embodiment of the present invention.
Figure 4B:
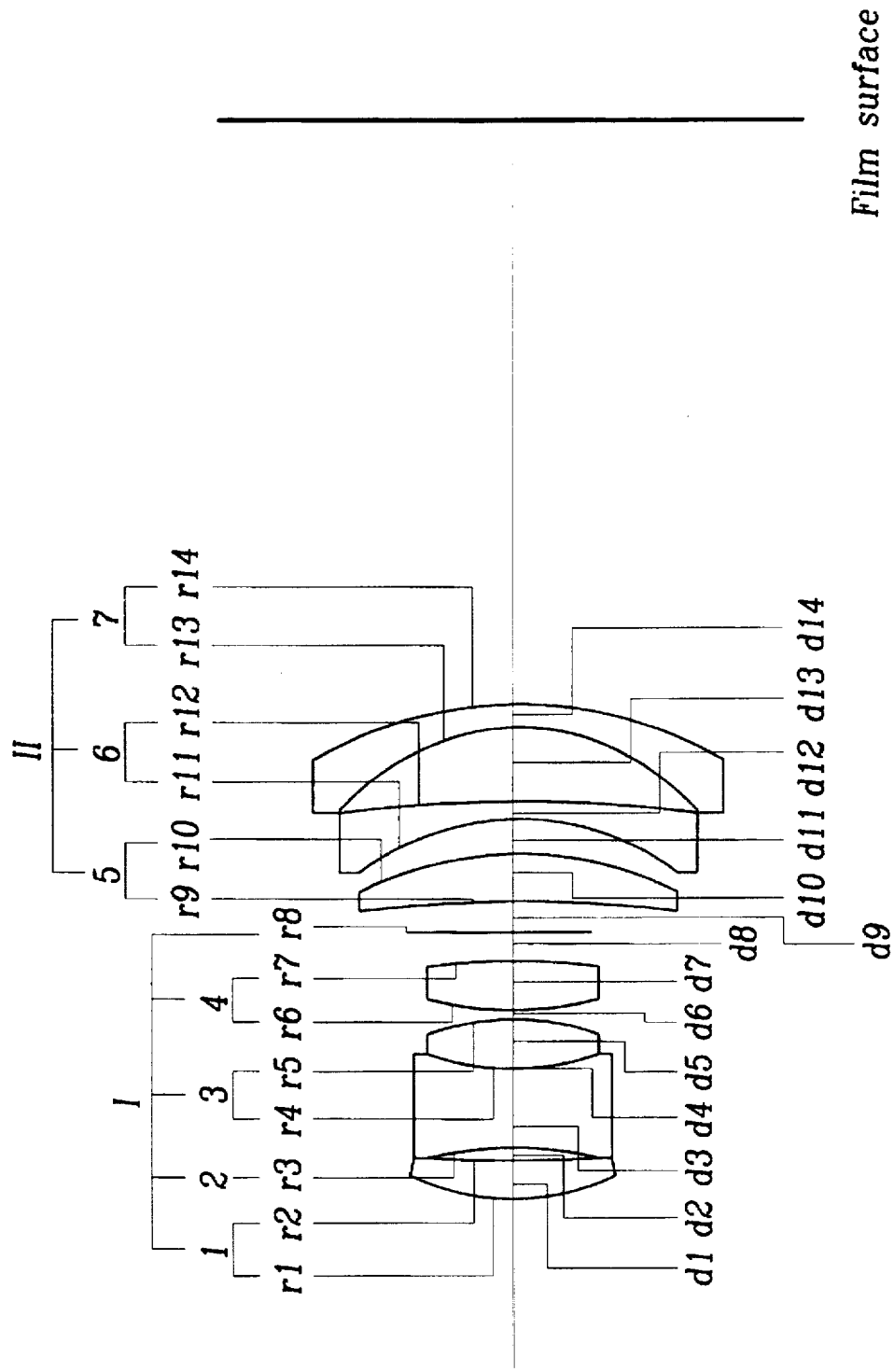
Figure 7A:
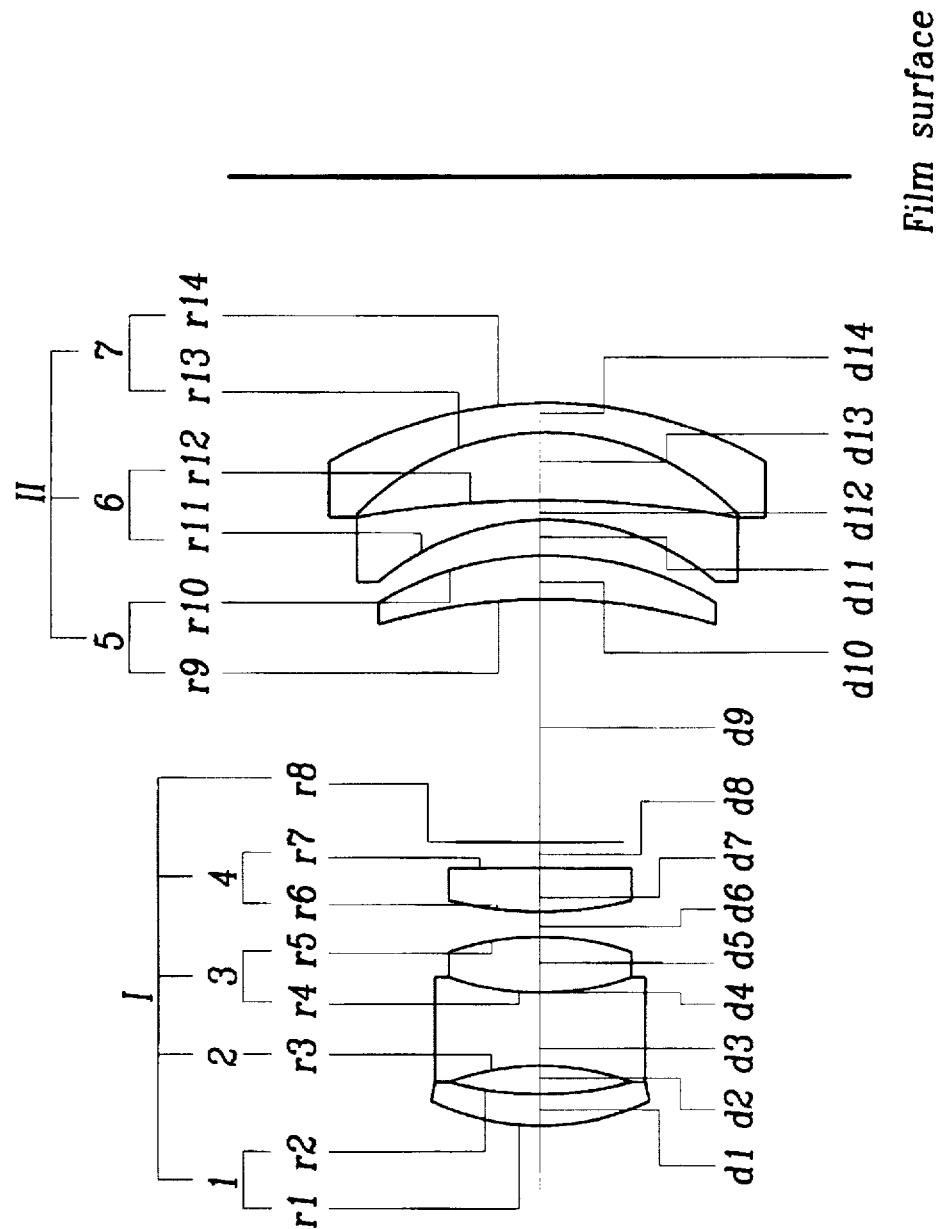
FIGS. 7A and 7B are sectional views illustrating a compact zoom lens system at a wide angle position and a telephoto angle position, respectively, in accordance with a third preferred embodiment of the present invention.
Figure 7B:
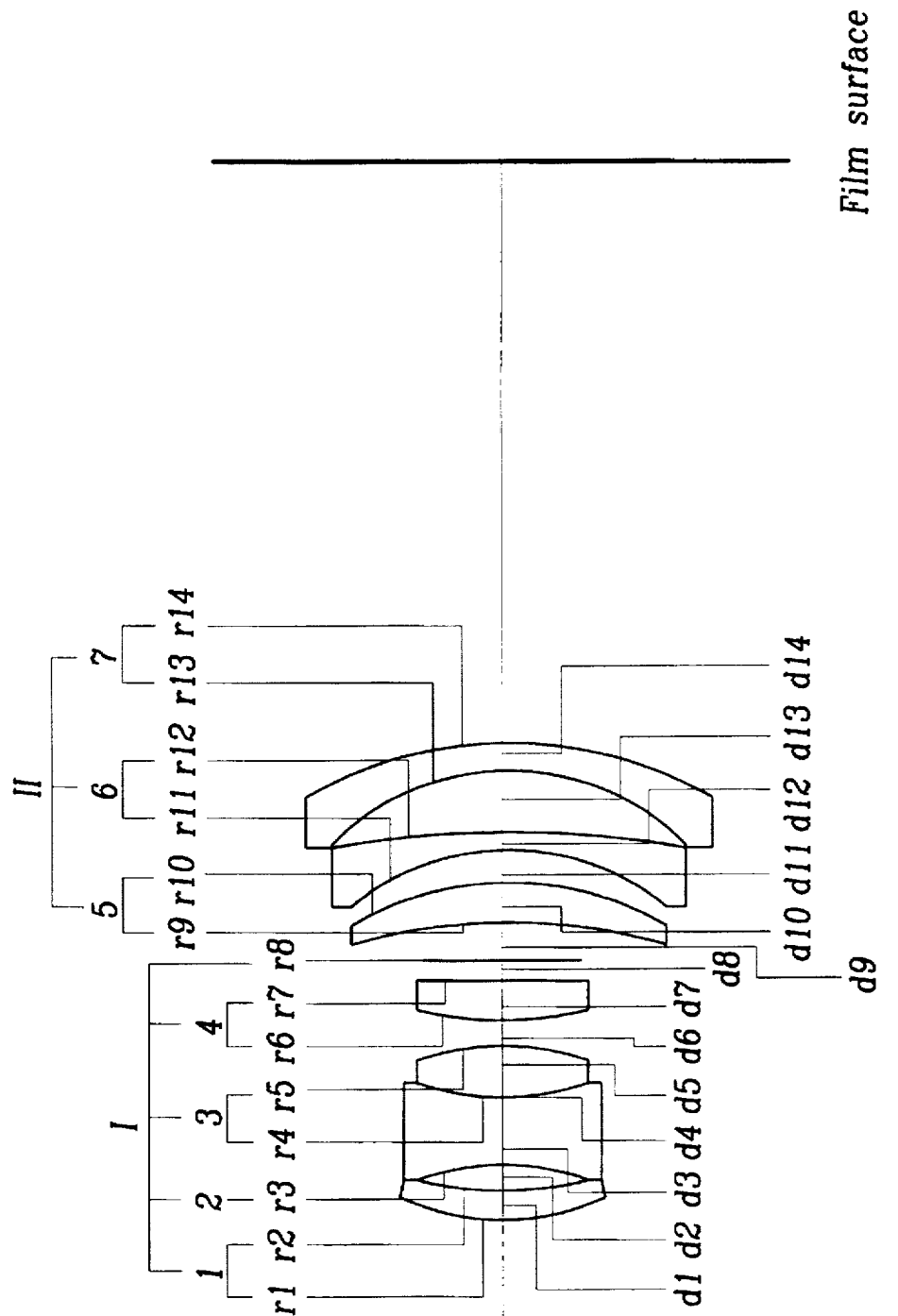
Figure 10A:
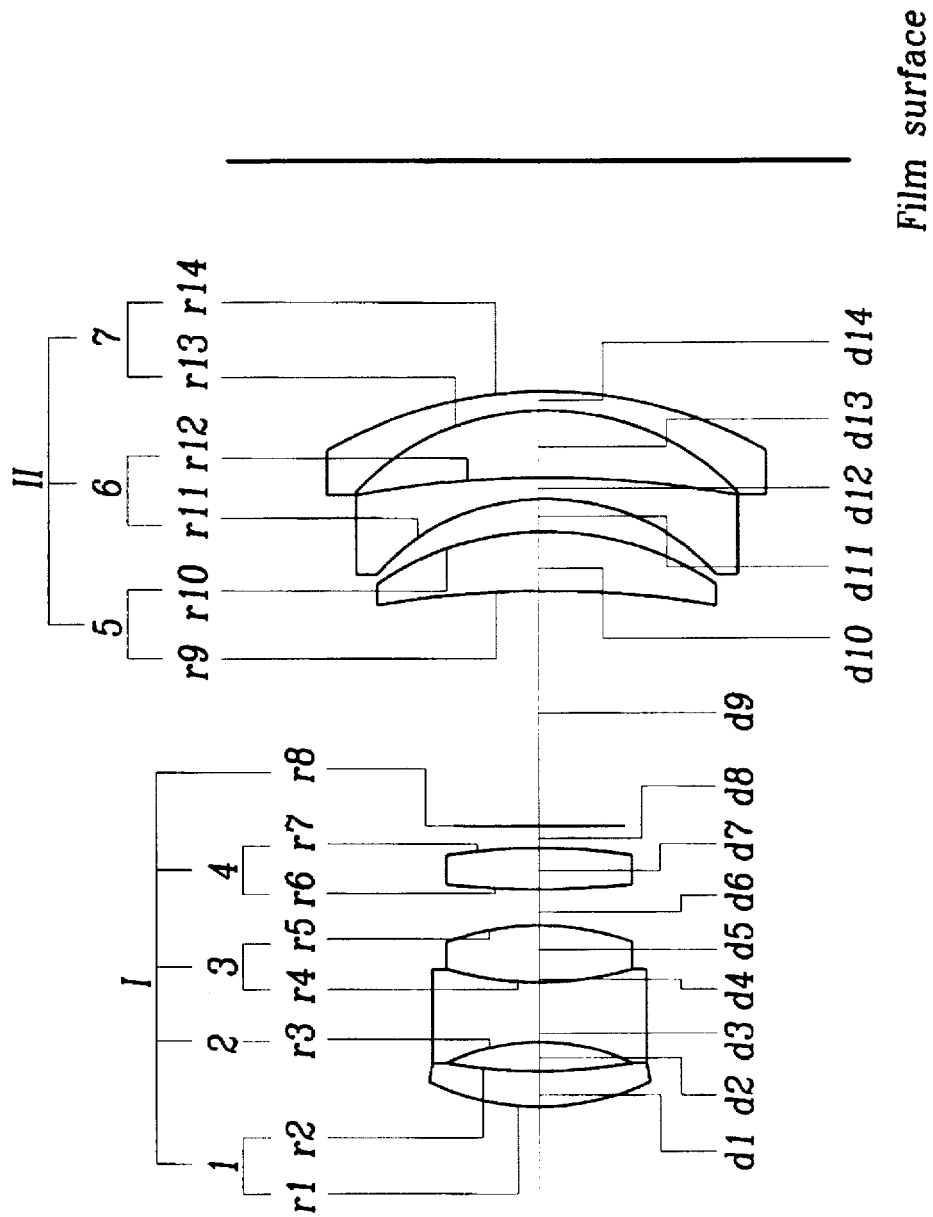
FIGS. 10A and 10B are sectional views illustrating a compact zoom lens system at a wide angle position and a telephoto angle position, respectively, in accordance with a fourth preferred embodiment of the present invention.
Figure 10B:
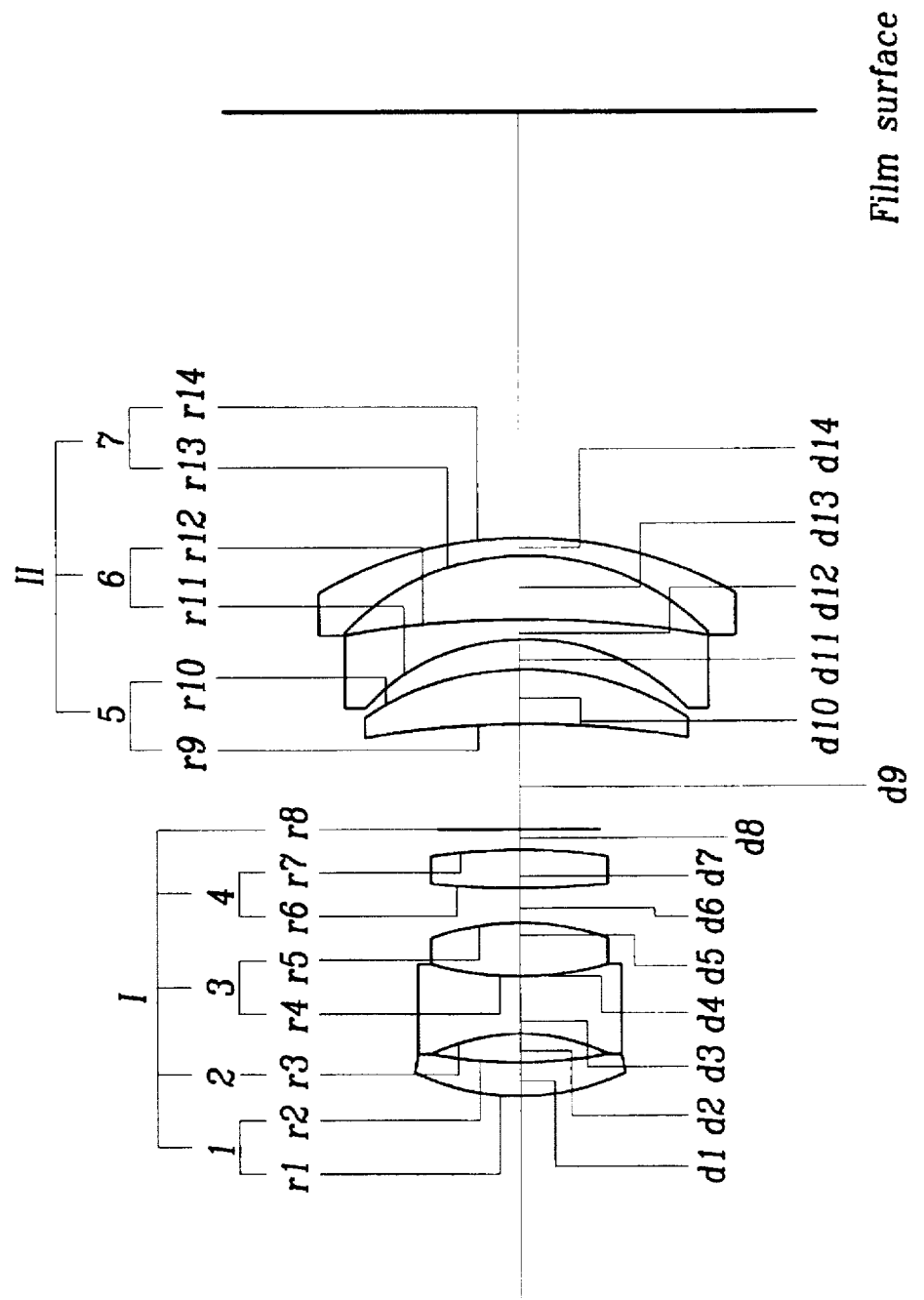
Figure 13A:
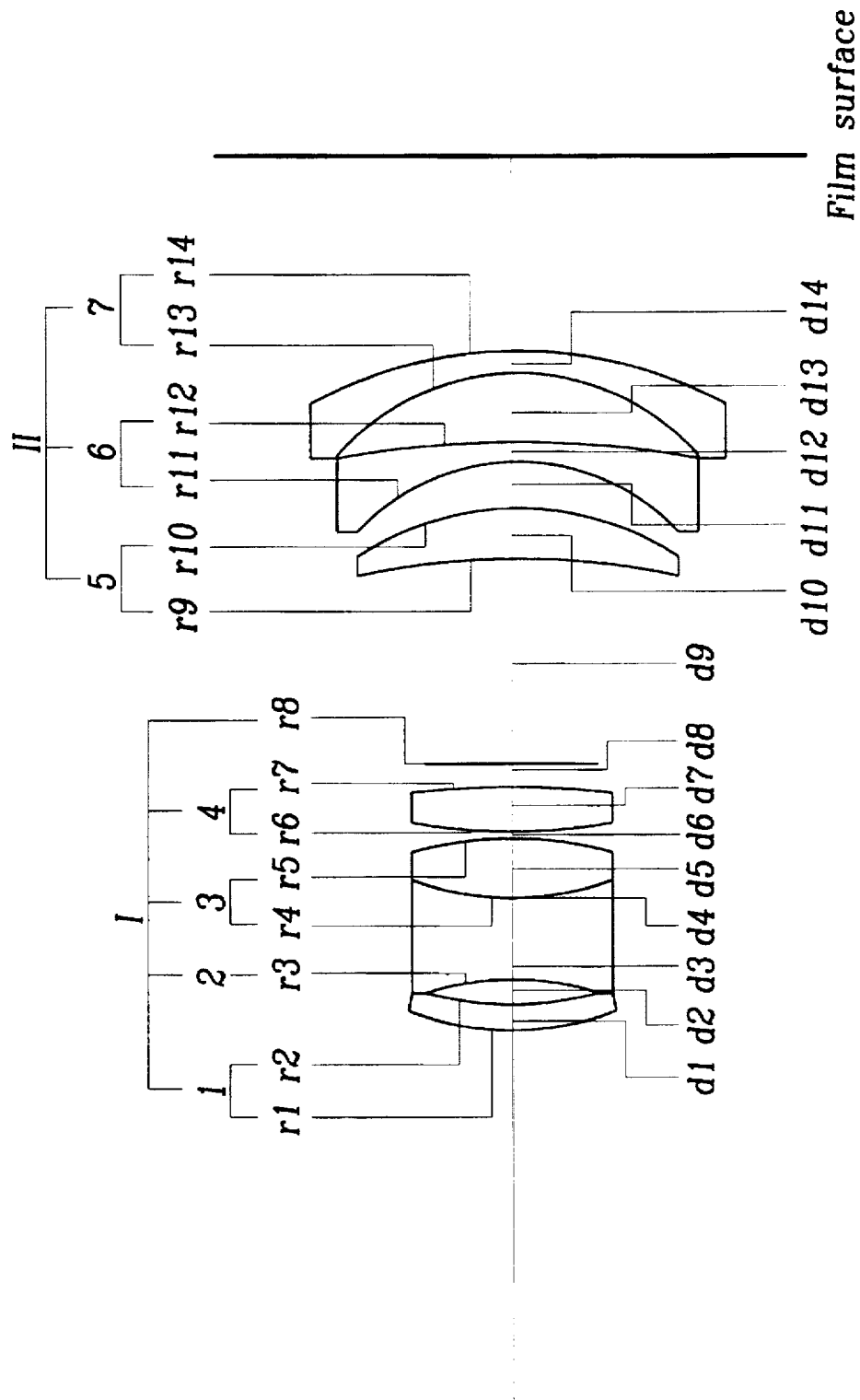
FIGS. 13A and 13B are sectional views illustrating a compact zoom lens system at a wide angle position and a telephoto angle position, respectively, in accordance with a fifth preferred embodiment of the present invention.
Figure 13B:
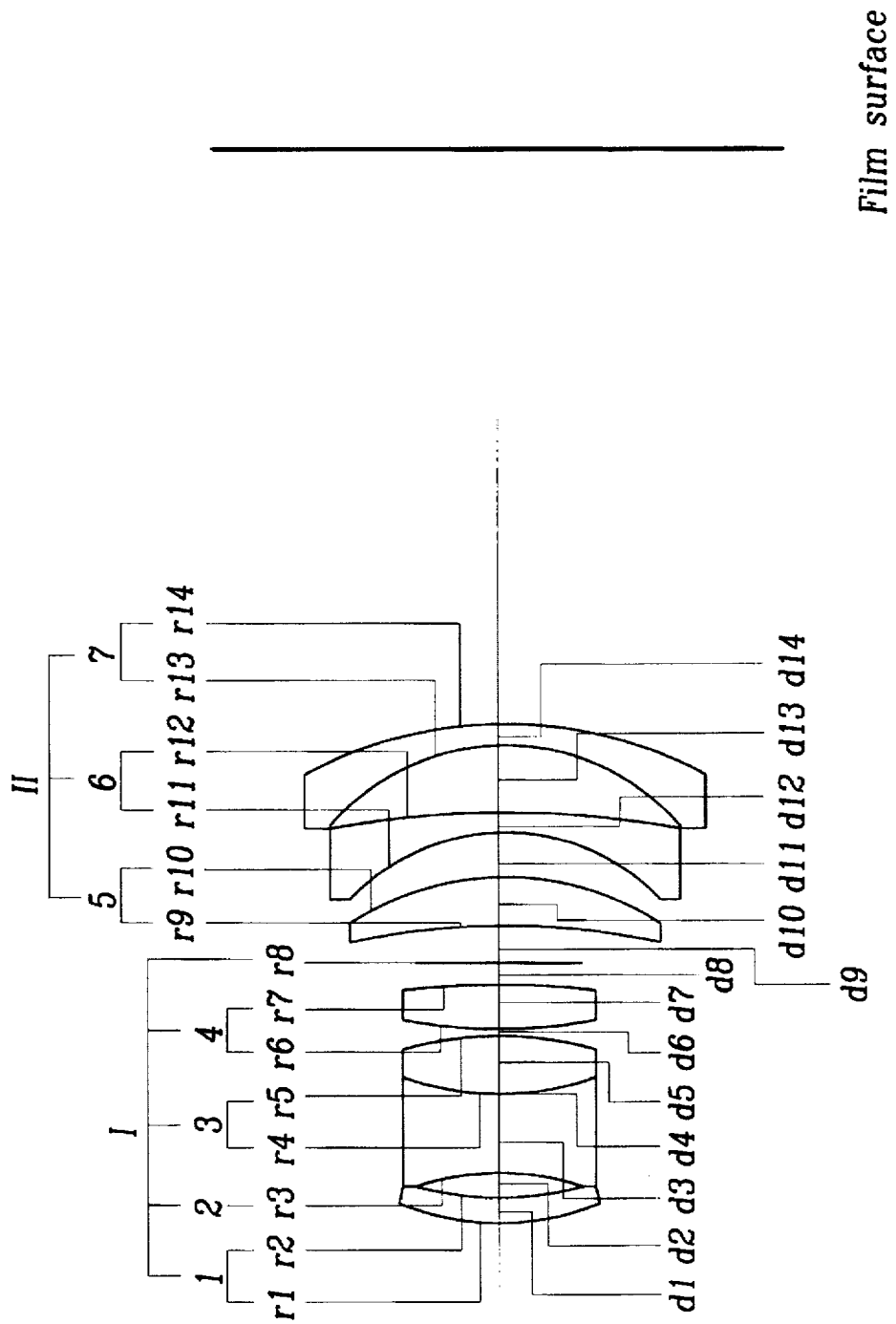

As illustrated in FIGS. 1, 4, 7, 10 and 13, preferred embodiments according to the present invention provide a compact zoom lens system. Starting from the objective side of the zoom lens system (i.e., from the left side of the Figures), a first lens group I forms an image of an object and provides the image to a second lens group II.

The first lens group, having an overall positive refractive power, includes four lenses. A first lens unit 1 is a meniscus lens, convex toward the object side, having a positive refractive power. A second lens unit 2 is a biconcave lens having a negative refractive power. A third lens unit 3 is a biconvex lens having a positive power and is connected to the second lens unit 2. A fourth lens unit 4 is a biconvex lens having a positive refractive power.

The second lens group II, which has an overall negative refractive power, includes three lenses. A fifth lens unit 5 is a concave lens having a positive refractive power. A sixth lens unit 6 is a concave lens having a negative refractive power. A seventh lens unit 7 has a negative refractive power.

When zooming from a wide angle position to a telephoto position, the first and second lens groups I and II, as well as the distance between the two groups, shifts toward the object of view. In accordance with a preferred embodiment of the invention, the compact zoom lens system satisfies the following conditions:

(1) $1.1<(f_{bT}-f_{bW})/(L_T-L_W)<1.24$;

(2) $L_W/f_W<1.25$;

(3) $L_T/f_T<0.97$;

(4) $0.20<f_1/f_T<0.35$;

(5) $0.20<|f_2|/f_T<0.32$;

(6) $0.6<f_1/f_W<0.69$;

(7) $0.5<|f_2|/f_W<0.65$;

(8) $2.0<f_{2p}/|f_{2n}|<3.7$;

(9) $0.2<_{D2}/f_W<0.3$;

(10) $-0.35<N_{1p}-N_{1n}<-0.23$;

(11) $0<N_{2p}-N_{2n}<0.2$;

(12) $15.0<V_{1p}-V_{1n}<25$;

where:

$L_W$ is a total length of the whole zoom lens system at the wide angle position;

$L_T$ is a total length of the whole zoom lens system at the telephoto angle position;

$f_{bT}$ is a back focal length at the telephoto angle position;

$f_{bW}$ is a back focal length at the wide angle position;

$f_W$ is a focal length of the entire zoom lens system at the wide angle position;

$f_T$ is a focal length of the whole zoom lens system at the telephoto angle position;

$f_1$ is a focal length of the first lens group I;

$f_2$ is a focal length of the second lens group II;

$f_{2P}$ is a focal length of the lens unit of a positive refractive power of the second lens group II;

$f_{2n}$ is a resultant focal length of the lens units having negative refractive powers of the second lens group II;

$D_2$ is the sum of thicknesses of the lens units and the distances between the lens units of the second lens group II;

$N_{1p}$ is an average refractive index of the lens units having positive refractive powers of the first lens group I;

$N_{1n}$ is an average refractive index of the lens unit having a negative refractive power of the first lens group I;

$N_{2p}$ is an average refractive index of the lens unit having a positive refractive power of the second lens group II;

$N_{2n}$ is an average refractive index of the lens units having negative refractive powers of the second lens group II;

$V_{1p}$ is an average Abbe number of the lens units having a positive refractive power of the first lens group I; and $V_{1n}$ is an Abbe number of the lens unit having a negative refractive power of the first lens group I.

The above condition (1) is related to the amount of shift of each lens group during zooming. If the upper limit value of condition (1) is exceeded, then the amount of shift of the second lens group II is increased. On the other hand, if the lower limit value of condition (1) is not complied with, then the amount of shift of the first lens group I is increased.

Conditions (2) and (3) are related to a telephoto ratio at a wide angle position and at a telephoto angle position, respectively. If the upper limit value of conditions (2) and (3) are exceeded, then it will be difficult to reduce the lens system to a sufficiently compact size.

Condition (4) is related to the refractive power of the first lens group I. If the upper limit value of condition (4) is exceeded, then the amount of shift of lens groups I and II is increased as the magnification is changed and as refractive power is reduced. On the other hand, if the lower limit value of condition (4) is not complied with, then it will be difficult to correct the aberration of the first lens group I as the magnification is changed and as refractive power and the change in aberration are both increased.

Condition (5) is related to a refractive power of a second lens group II. If the upper limit value of condition (5) is exceeded, then the amount of shift lens groups I and II is increased as the magnification is changed and as the refractive power is reduced. On the other hand, if the lower limit value of condition (5) is not complied with, it will be difficult to correct the aberration of the second lens group I as the magnification is changed and as the refractive power and the change in aberration are both increased.

Conditions (6) and (7) are related to the refractive power of the first lens group I and the second lens group II, respectively. If the upper limit values of conditions (6) and (7) are exceeded, then it will be easy to correct the aberration. However, it will be difficult to reduce the size of the lens system as the amount of shift is increased. On the other hand, if the lower limit value of conditions (6) and (7) are not complied with, then the change in aberration is increased. This will occur because the refractive power of each lens group will be increased, and thus it will be difficult to correct the coma aberration and the astigmatism.

Condition (8) is related to the refractive power of the second lens group II. If the upper limit value of condition (8) is exceeded, the refractive power of the second lens group II is increased as the positive refractive power of the lens system is increased in the second lens group II. In this case, it will be easy to reduce the size of the lens system, but the aberration is increased when the magnification is changed. On the other hand, if the lower limit value of condition (8) is not complied with if the refractive power of the second lens group II is positive, then this refractive power will be reduced. Accordingly, it will be easy to correct the aberration. However, since the amount of shift of the lens groups I and II is increased, it will be difficult to reduce the size of the lens system.

Condition (9) is related to the length of the second lens group II. If the upper limit value of condition (9) is exceeded, it will difficult to reduce the size of the lens system. On the other hand, if the lower limit value of condition (9) is not complied with, it will be possible to reduce the lens system's size. However, the processing efficiency will be reduced as the air space and the thickness of the lens system is reduced. Furthermore, performance may be reduced due to a manufacturing error with respect to the air space.

Condition (10) is related to the refractive index of the first lens group I. If the upper limit value of condition (10) is exceeded and if the refractive power of the lens system is positive, then the manufacturing cost is increased as this refractive power increases. On the other hand, if the lower limit value of the condition (10) is not complied with and if the refractive power of the lens system is negative, then the manufacturing cost will again increase as this refractive power increases or as the lens system's refractive index becomes excessively low. In this case, the manufacturing cost will be high since special low dispersive materials will needed in the construction of the lens system.

Condition (11) is related to a refractive index of the second lens group II. If the upper limit value of condition (11) is exceeded, then it will be difficult to correct the astigmatism. On the other hand, if the lower limit value of condition (11) is not complied with and if the refractive power of the lens system is positive, then there will be difficulties with the assembly of the system. This occurs since the clearance of an iris out of an effective diameter by a subject side face will have a significantly concaved face.

Values which satisfy the above-mentioned conditions, according to a preferred embodiment of the invention, are described in the Tables below in which all units of length are denominated in millimeters. In addition, in accordance with a preferred embodiment of the invention, the aperture iris is installed between the first lens group I and the second lens group II. In each of these Tables, the following variables are used:

f represents the focal point length;

ri (i=1 to 14) represents the radius curvature;

di (i=1 to 14) represents the thickness of a lens unit or the length between lens units;

nd represents the d-line refractive index of a lens unit;

v represents the Abbe number of a lens unit;

m represents the magnification of the entire lens system; and

W represents the half viewing angle.

Values for a first preferred embodiment of the present invention are shown in Table 1, where: the iris value F of a large aperture zoom lens system ranges from 4.09 to 9.48; the focal point length f ranges from 35.509 mm to 82.252 mm; the half viewing angle W ranges from 30.73° to 14.71°; and the back focal length $f_B$ ranges from 8.084 mm to 51.468 mm.

TABLE 1

| Face No. | Radius curvature (r) | Thickness, length (d) | Refractive index (nd) | ABBE No. (v) |
|---|---|---|---|---|
| 1 | 13.852 | 1.99 | 1.48749 | 70.44 |
| 2 | 72.013 | 1.22 | | |
| 3 | −14.991 | 4.10 | 1.80420 | 46.50 |
| 4 | 17.237 | 3.25 | 1.51680 | 64.20 |
| 5 | −12.165 | 0.10 | | |
| 6 | 26.244 | 2.00 | 1.51680 | 64.20 |
| 7 | −38.524 | 1.25 | | |
| 8 | iris | Z | | |
| *9 | −33.019 | 2.21 | 1.81474 | 33.27 |
| 10 | −14.262 | 1.68 | | |
| 11 | −11.105 | 0.95 | 1.77250 | 49.62 |
| 12 | −73.949 | 3.50 | | |
| 13 | −11.310 | 0.95 | 1.56384 | 60.83 |
| 14 | −19.942 | | | | where * represents the aspherical surface and Z ranges from 10.7329 mm to 2.2000 mm.

A coefficient of an aspherical surface of the lens system is described by the following formula:

$$X = \frac{cS^2}{1 + \sqrt{(1-(K+1)c^2S^2)}} + A4S_4 + A6S_6 + A8S_8 + A10S_{10}$$

where:

$c = 1/r$;

X represents a displacement amount from a reference surface along the optical axis S represents a height in a direction perpendicular to the optical axis K represents a conic constant, the value of which is given in Table 2;

A4, A6, A8, A10 represent the aspherical coefficients, values of which are given in Table 2; and r represents the radius curvature.

TABLE 2

| Aspherical coefficients of the aspherical surface | |
|---|---|
| K | 0.5019849501752E + 1 |
| A4 | 0.5408777947066E − 4 |
| A6 | −0.1554452815300E − 6 |

TABLE 2-continued

| Aspherical coefficients of the aspherical surface | |
|---|---|
| A8 | 0.1474644558381E − 7 |
| A10 | −0.1247160879942E − 9 |

Figures 3A, 3B, 3C:
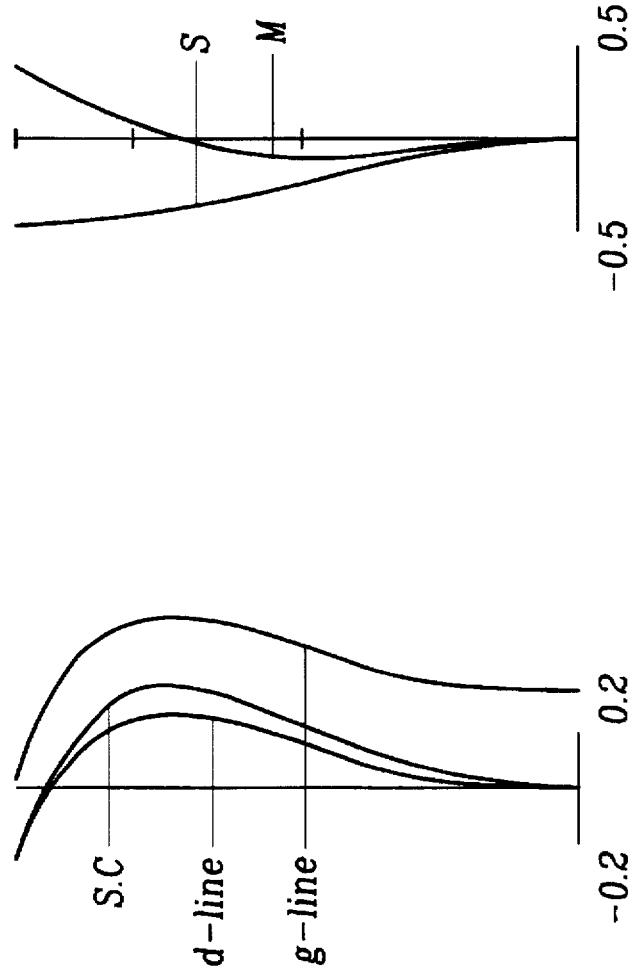
FIGS. 3A to 3C show the aberration curves of a compact zoom lens system at a telephoto angle position in accordance with the first preferred embodiment of the present invention.

FIGS. 2A to 2C and FIGS. 3A to 3C illustrate the superior aberration characteristics of the first preferred embodiment, at a wide angle and at a telephoto angle position, respectively.

Values for a second preferred embodiment of the present invention are shown in Table 3, where: the iris value F of the compact zoom lens system ranges from 4.09 to 9.78; the focal point length f ranges from 34.294 mm to 81.957 mm; the half viewing angle W ranges from 31.55° to 14.75°; and the back focal length $f_B$ ranges from 8.496 mm to 48.4235 mm.

TABLE 3

| Face No. | Radius curvature (r) | Thickness, length (d) | Refractive index (nd) | ABBE No. (v) |
|---|---|---|---|---|
| 1 | 13.491 | 1.57 | 1.51742 | 52.15 |
| 2 | 52.178 | 0.82 | | |
| 3 | −14.860 | 4.62 | 1.83500 | 42.98 |
| 4 | 14.860 | 2.85 | 1.51823 | 58.96 |
| 5 | −12.678 | 0.58 | | |
| 6 | 21.477 | 2.78 | 1.48749 | 70.44 |
| 7 | −21.477 | 1.25 | | |
| 8 | iris | Z | | |
| *9 | 32.044 | 2.06 | 1.80518 | 25.46 |
| 10 | −14.798 | 2.06 | | |
| 11 | −11.489 | 0.95 | 1.83400 | 37.34 |
| 12 | −76.957 | 3.51 | | |
| 13 | −10.253 | 1.01 | 1.51680 | 64.20 |
| 14 | −21.253 | | | | where * represents the aspherical surface and Z ranges from 8.5640 mm to 2.2000 mm.

According to the second embodiment of the present invention, the coefficient of the aspherical surface is described by the above formula using the aspherical coefficients shown in Table 4.

TABLE 4

| Aspherical coefficients of the aspherical surface | |
|---|---|
| K | 0.1056257861457E + 1 |
| A4 | 0.3758393429605E − 4 |
| A6 | −0.2378316850648E − 7 |
| A8 | 0.7140053369628E − 8 |
| A10 | −0.6619121795638E − 10 |

FIGS. 5A to 5C and FIGS. 6A to 6C illustrate the superior aberration characteristics of the second preferred embodiment, at a wide angle and at a telephoto angle position, respectively.

Values for a third preferred embodiment of the present invention are shown in Table 5, where: the iris value F of the large aperture zoom lens system ranges from 4.09 to 9.37; the focal point length f ranges from 35.8087 mm to 81.8804 mm; the half viewing angle W ranges from 30.34° to 14.83°; and the back focal length $f_B$ ranges from 8.483 mm to 49.806 mm.

TABLE 5

| Face No. | Radius curvature (r) | Thickness, length (d) | Refractive index (nd) | ABBE No. (v) |
|---|---|---|---|---|
| 1 | 13.103 | 2.00 | 1.48749 | 70.44 |
| 2 | 33.444 | 1.64 | | |
| 3 | −15.604 | 3.84 | 1.80420 | 46.50 |
| 4 | 15.604 | 3.47 | 1.51680 | 64.20 |
| 5 | −12.058 | 1.68 | | |
| 6 | 18.579 | 2.62 | 1.51680 | 64.20 |
| 7 | −56.773 | 1.24 | | |
| 8 | iris | Z | | |
| *9 | −28.590 | 2.00 | 1.80610 | 33.27 |
| 10 | −13.897 | 2.10 | | |
| 11 | −12.182 | 0.95 | 1.80420 | 46.50 |
| 12 | −70.996 | 2.70 | | |
| 13 | −12.459 | 1.50 | 1.8.0420 | 46.50 |
| 14 | −21.830 | | | | where * represents the aspherical surface and Z ranges from 10.1219 mm to 2.2000 mm.

According to the third embodiment of the present invention, the coefficient of the aspherical surface is described by the above formula using the aspherical coefficients shown in Table 6.

TABLE 6

| Aspherical coefficients of the aspherical surface | |
|---|---|
| K | 0.2174811886253E + 1 |
| A4 | 0.2849056773763E − 4 |
| A6 | −0.4948842564394E − 7 |
| A8 | 0.6509023007091E − 8 |
| A10 | −0.3537735350641E − 10 |

Figures 8A, 8B, 8C:
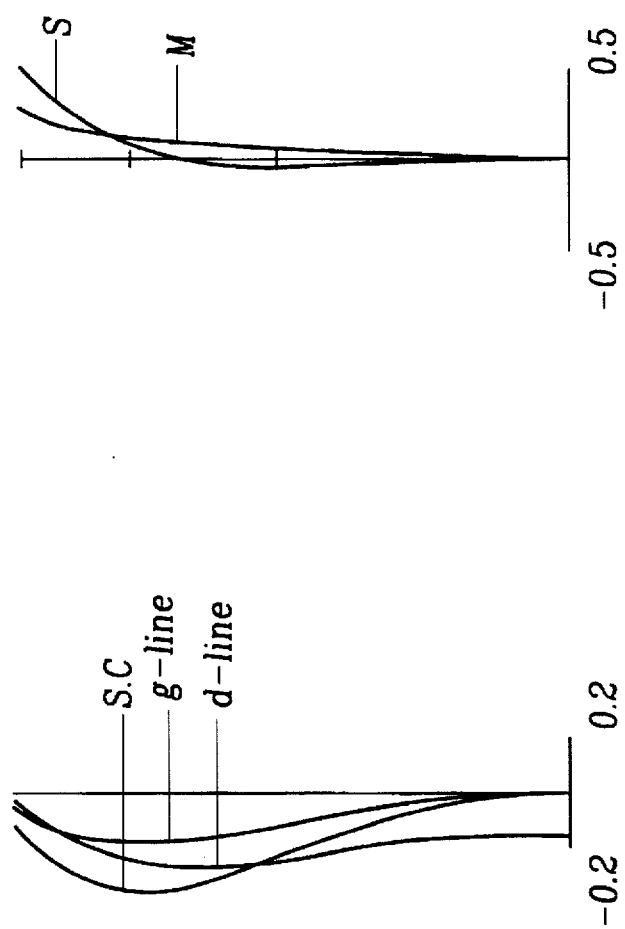
FIGS. 8A to 8C show the aberration curves of a compact zoom lens system at a wide angle position in accordance with the third preferred embodiment of the present invention.

FIGS. 8A to 8C and FIGS. 9A to 9C illustrate the superior aberration characteristics of the third preferred embodiment, at a wide angle and at a telephoto angle position, respectively.

Values for a fourth preferred embodiment of the present invention are shown in Table 7, where: the iris value F of the large aperture zoom lens system ranges from 4.09 to 9.29; the focal point length f ranges from 36.123 mm to 81.939 mm; the half viewing angle W ranges from 30.30° to 14.75°; and the back focal length $f_B$ ranges from 8.067 mm to 48.783 mm.

TABLE 7

| Face No. | Radius curvature (r) | Thickness, length (d) | Refractive index (nd) | ABBE No. (v) |
|---|---|---|---|---|
| 1 | 13.821 | 2.00 | 1.48149 | 70.44 |
| 2 | 65.646 | 1.34 | | |
| 3 | −14.011 | 2.85 | 1.80420 | 46.50 |
| 4 | 17.512 | 2.94 | 1.51680 | 61.50 |
| 5 | −11.368 | 1.90 | | |
| 6 | 27.882 | 2.00 | 1.51680 | 64.20 |
| 7 | −33.206 | 1.25 | | |
| 8 | iris | Z | | |
| *9 | −37.247 | 2.76 | 1.81474 | 33.27 |
| 10 | −14.534 | 1.64 | | |
| 11 | −11.052 | 0.95 | 1.78036 | 48.04 |
| 12 | −68.011 | 3.51 | | |
| 13 | −12.858 | 0.95 | 1.68783 | 54.68 |
| 14 | −23.726 | | | | where * represents the aspherical surface and Z ranges from 10.3558 mm to 2.2000 mm.

According to the fourth embodiment of the present invention, the coefficient of the aspherical surface is described by the above formula using the aspherical coefficients shown in Table 8.

TABLE 8

| | Aspherical coefficients of the aspherical surface |
|---|---|
| K | 0.2174811886253E + 1 |
| A4 | 0.2849056773763E − 4 |
| A6 | 0.4948842564394E − 7 |
| A8 | 0.6509023007091E − 8 |
| A10 | −0.3537735350641E − 10 |

FIGS. 11A to 11C and FIGS. 12A to 12C illustrate the superior aberration characteristics of the fourth preferred embodiment, at a wide angle and at a telephoto angle position, respectively.

Values for a fifth preferred embodiment of the present invention are shown in Table 9, where: the iris value F of the large aperture zoom lens system ranges from 4.09 to 9.88; the focal point length f ranges from 34.138 mm to 82.389 mm; the half viewing angle W ranges from 31.66° to 14.67°; and the back focal length $f_B$ ranges from 8.487 mm to 50.413 mm.

TABLE 9

| Face No. | Radius curvature (r) | Thickness, length (d) | Refractive index (nd) | ABBE No. (v) |
|---|---|---|---|---|
| 1 | 12.812 | 1.66 | 1.450790 | 62.24 |
| 2 | 42.370 | 0.82 | | |
| 3 | −14.541 | 4.31 | 1.83500 | 42.98 |
| 4 | 14.789 | 2.98 | 1.54699 | 52.40 |
| 5 | −12.959 | 0.44 | | |
| 6 | 23.877 | 2.33 | 1.49700 | 81.61 |
| 7 | −22.667 | 1.25 | | |
| 8 | iris | Z | | |
| *9 | −31.112 | 2.07 | 1.80518 | 25.46 |
| 10 | −15.026 | 2.37 | | |
| 11 | −10.789 | 0.95 | 1.83400 | 37.34 |
| 12 | −53.749 | 2.74 | | |
| 13 | −12.800 | 1.23 | 1.51943 | 66.75 |
| 14 | −29.469 | | | | where * represents the aspherical surface and Z ranges from 9.2094 mm to 2.2000 mm.

According to the fifth embodiment of the present invention, the coefficient of the aspherical surface is described by the above formula using the aspherical coefficients shown in Table 10.

TABLE 10

| | Aspherical coefficients of the aspherical surface |
|---|---|
| K | 0.9691606678033E + 0 |
| A4 | 0.3848477089595E − 4 |
| A6 | −0.9427513205174E − 8 |
| A8 | 0.8165569143560E − 8 |
| A10 | −0.6948318355497E − 10 |

FIGS. 14A to 14C and FIGS. 15A to 15C illustrate the superior aberration characteristics of the fifth preferred embodiment, at a wide angle and at a telephoto angle position, respectively.

In accordance with the preferred embodiments of the present invention, the present invention can provide a compact zoom lens system that has a high performance and a high zooming ratio.

Other embodiments of the invention will be apparent to the skilled in the art from consideration of the specification and practice of the invention disclosed herein. It is intended that the specification and examples be considered as exemplary only, with the true scope and spirit of the invention being indicated by the following claims.

What is claimed is:

1. A compact zoom lens system, from an object side to an image side, comprising:
   a first lens group which has an overall positive refractive power, the first lens group comprising:
   a first lens unit which is meniscus lens that is convex toward an object, and which has a positive refractive power;
   a second lens unit which is biconcave lens having a negative refractive power;
   a third lens unit which is a biconvex lens having a positive refractive power, and which is fixed to the second lens unit; and
   a fourth lens unit which is a biconvex lens having a positive refractive power;
   a second lens group which has an overall negative refractive power, the second lens group comprising:
   a fifth lens unit which is a meniscus lens, that is convex toward the object, and which has a positive refractive power;
   a sixth lens unit which is a concave lens having a negative refractive power; and
   a seventh lens unit which has a negative refractive power; and
   wherein the magnification of the system can be changed by varying a distance between the first lens group and the second lens group, and wherein the following conditions are satisfied:

$$1.1 < (f_{bT} - f_{bW})/(L_T - L_W) < 1.24$$

$$L_W/f_W < 1.25,$$

$$L_T/f_T < 0.97,$$

where:
   $L_W$ represents the length of the zoom lens system at a wide angle position;
   $L_T$ represents the length of the zoom lens system at a telephoto angle position;
   $f_{bT}$ represents a back focal length at the telephoto angle position;
   $f_{bW}$ represents a back focal length at the wide angle position;
   $f_W$ represents a focal length of the zoom lens system at the wide angle position; and
   $f_T$ represents a focal length of the zoom lens system at the telephoto angle position.

2. The system of claim 1, wherein the following conditions are satisfied:

$$0.20 < f_1/f_T < 0.35,$$

$$0.20 < |f_2|/f_T < 0.32,$$

where:
   $f_1$ represents a focal length of the first lens group; and
   $f_2$ represents a focal length of the second lens group.

3. The system of claim 1, wherein the following conditions are satisfied:

$$0.6 < f_1/f_W < 0.69,$$

$$0.5 < |f_2|/f_W < 0.65,$$

where:

$f_1$ represents a focal length of the first lens group; and $f_2$ represents a focal length of the second lens group.

4. The system of claim 1, wherein the following conditions are satisfied:

$$2.0 < f_{2p}/|f_{2n}| < 3.7,$$

$$0.2 < _{D2}/f_W < 0.3,$$

where:

$f_{2p}$ represents a focal length of the fifth lens unit;

$f_{2n}$ represents a resultant focal length of the sixth and seventh lens units; and $D_2$ represents the thickness of the second lens group.

5. The system of claim 1, wherein the following conditions are satisfied:

$$-0.35 < N_{1p} - N_{1n} < -0.23,$$

$$0 < N_{2p} - N_{2n} < 0.2,$$

where:

$N_{1p}$ represents an average refractive index of the first, third and fourth lens units;

$N_{1n}$ represents a refractive index of the second lens unit;

$N_{2p}$ represents a refractive index of the fifth lens unit; and $N_{2n}$ represents an average refractive index of the sixth and seventh lens units.

6. The system of claim 1, wherein the following condition is satisfied:

$$15.0 < V_{1p} - V_{1n} < 25,$$

where:

$V_{1p}$ represents an average Abbe number of the first, third and fourth lens units; and $V_{1n}$ represents an Abbe number of the second lens unit.

* * * * *

UNITED STATES PATENT AND TRADEMARK OFFICE
CERTIFICATE OF CORRECTION

PATENT NO. : 5,726,811
DATED : March 10, 1998
INVENTOR(S) : Geon-Mo KANG et al.

It is certified that error appears in the above-identified patent and that said Letters Patent is hereby corrected as shown below:

Title Page, Item [57], in the Abstract, line 1, after "compact", insert --zoom--.

Claim 1, column 10, line 9, before "meniscus", insert --a--.

Claim 1, column 10, line 12, before "biconcave", insert --a--.

Claim 1, column 10, line 35, after, "1.24", insert --,--.

Signed and Sealed this

Ninth Day of March, 1999

Attest:

Attesting Officer

Q. TODD DICKINSON

Acting Commissioner of Patents and Trademarks